(12) United States Patent
Vemulapati (10) Patent No.: US 9,176,792 B2
(45) Date of Patent: Nov. 3, 2015

(54) CLASS-BASED MUTEX

(71) Applicant: Apple Inc., Cupertino, CA (US)

(72) Inventor: Murali Vemulapati, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 13/913,463

(22) Filed: Jun. 9, 2013

(65) Prior Publication Data

US 2014/0366036 A1    Dec. 11, 2014

(51) Int. Cl.
*G06F 9/52* (2006.01)
*G06F 9/50* (2006.01)

(52) U.S. Cl.
CPC .... *G06F 9/52* (2013.01); *G06F 9/50* (2013.01)

(58) Field of Classification Search
None
See application file for complete search history.

(56) References Cited

U.S. PATENT DOCUMENTS

| 7,231,554 | B2 | 6/2007 | Moser et al. |
| 7,512,950 | B1 | 3/2009 | Marejka |
| 2004/0039884 | A1 | 2/2004 | Li |
| 2004/0078617 | A1 | 4/2004 | Moser et al. |
| 2013/0086348 | A1* | 4/2013 | Marathe et al. ............... 711/163 |

* cited by examiner

*Primary Examiner* — Qing Wu
(74) *Attorney, Agent, or Firm* — Fish & Richardson, P.C.

(57) ABSTRACT

When different types of shared resources need mutex protection, the shared resources can be organized into classes. Each class of shared resources can have multiple types of resources. A mutex pool can store multiple mutex objects, each mutex object corresponding to a class of resources. The mutex object can be used to protect each shared resource in the corresponding class.

24 Claims, 7 Drawing Sheets

CLASS-BASED MUTEX

TECHNICAL FIELD

This disclosure relates generally to memory management.

BACKGROUND

A computer can have a shared resource (e.g., a data structure or a portion of computer memory) and a policy specifying that, at any given time, the shared resource can be accessed by only one thread or process. Mutual exclusion (mutex) techniques can be used to implement the policy. Some mutex techniques include busy waiting. When a first thread or process is accessing the shared resource, if a second thread or process attempts to access the shared resource, a mutex object can cause the second thread or process to wait. The mutex object can then repeatedly examine status of the shared resource to determine if the first thread or process stopped accessing the shared resource. If the first thread or process stopped accessing the shared resource, the mutex object can allow the second thread or process to access the shared resource.

SUMMARY

Class-based mutex objects are described. When different types of shared resources need mutex protection, the shared resources can be organized into classes. Each class of shared resources can have multiple types of resources. A mutex pool can store multiple mutex objects, each mutex object corresponding to a class of resources. The mutex object can be used to protect each shared resource in the corresponding class.

The features described in this specification can be implemented to achieve the following advantages. In a system where one command can change many data structures, class-based mutex objects can reduce bottlenecks and avoid mutex conflicts. In a conventional system using a single mutex object to protect all data structures, the single mutex object may be used by all threads or processes accessing the data structures. Such a mutex object may be overused and become a bottleneck. A system implementing class-based mutex techniques can use multiple mutex objects to avoid the bottleneck.

In a conventional system where each data structure uses a separate mutex object, a single command can request multiple mutex objects, creating a possibility of a conflict (e.g., when mutex object A waits for mutex object B to finish, and, at the same time, mutex object B waits for mutex object A to finish). A system implementing class-based mutex techniques can arrange multiple mutex objects into classes to avoid the conflicts.

The details of one or more implementations of class-based mutex techniques are set forth in the accompanying drawings and the description below. Other features, aspects, and advantages of class-based mutex will become apparent from the description, the drawings, and the claims.

BRIEF DESCRIPTION OF THE DRAWINGS

Like reference symbols in the various drawings indicate like elements.

DETAILED DESCRIPTION

Exemplary Class-Based Mutex

Figure 1:
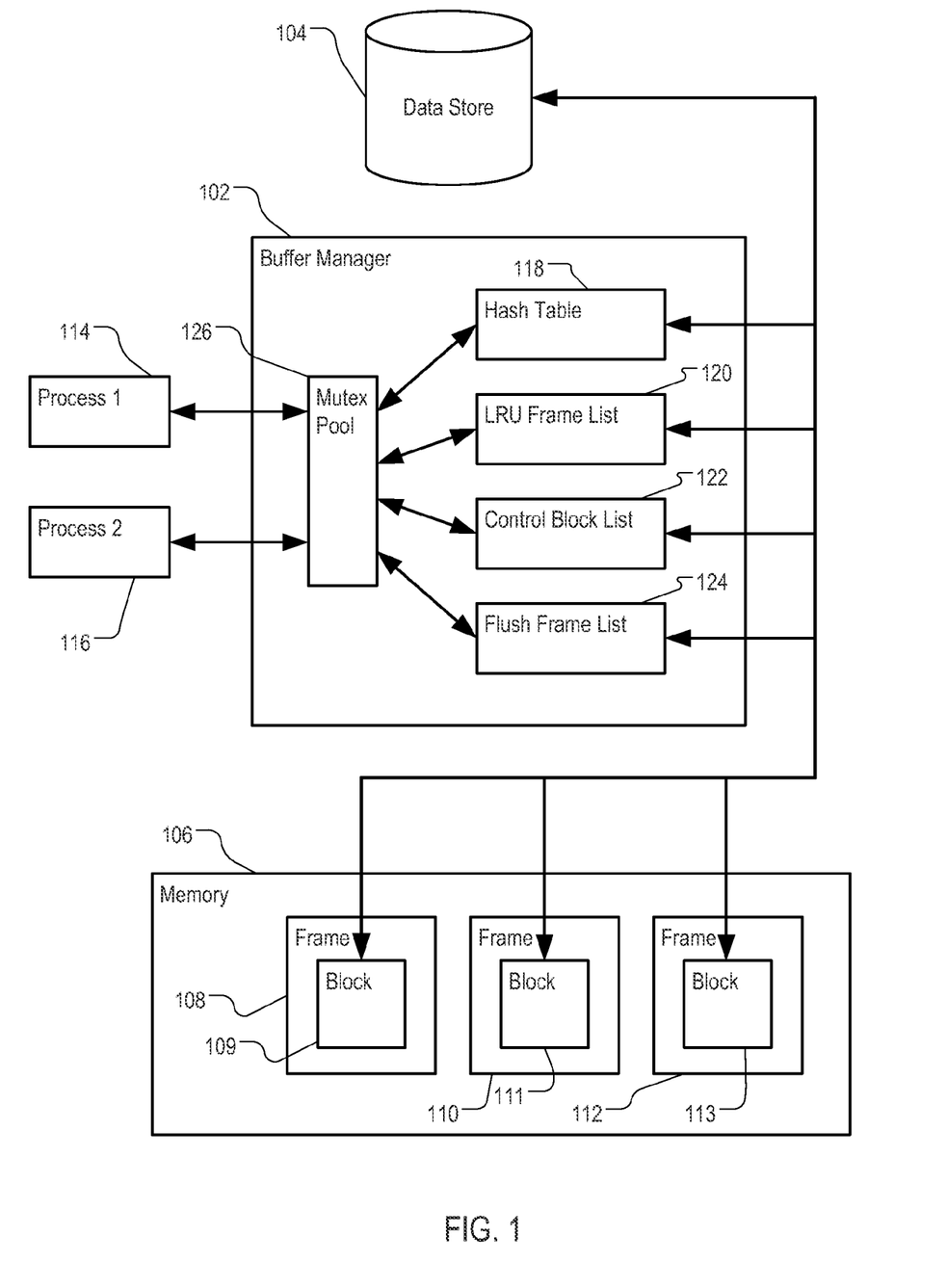
FIG. 1 is a block diagram providing an overview of class-based mutex techniques.

FIG. 1 is a block diagram providing an overview of class-based mutex techniques. Class-based mutex techniques can be implemented by buffer manager 102. Buffer manager 102 can include hardware and software configured to cache data from data store 104 into memory 106 for quick access. Data in data store 104 can be stored on a comparatively slow storage medium (e.g., a disk). Memory 106 can be a comparatively fast storage medium. The data can be stored in memory 106 in exemplary memory frames 108, 110, and 112 as data blocks 109, 111, and 113. Each of memory frames 108, 110, and 112 can be a unit of memory for storing one or more respective data blocks. Each of data blocks 109, 111, and 113 can correspond to a portion of data, e.g., a section of a file, stored in data store 104.

Buffer manager 102 can manage requests from process 114 and process 116. Process 114 and process 116 can be independent of each other. Each of process 114 and process 116 can request retrieving or modifying data in data store 104. To increase speed of the retrieval or modification, buffer manager 102 can retrieve or modify data block 109, 111, or 113 stored in memory 106, rather than directly access data store 104. Buffer manager 102 can periodically flush (write) data blocks in dirty memory frames in memory 106 to data store 104. A memory frame can be dirty when a data block stored in that memory frame is modified since a last flush. Buffer manager 102 can swap a data block stored in a memory frame for a new data block when the data block stored in a memory frame of memory 106 has been unused for a period of time.

Buffer manager 102 can include various data structures facilitating the operations of retrieving, modifying, flushing, and swapping data. These data structures can include hash table 118, least recently used (LRU) frame list 120, control block list 122, and flush frame list 124. Each of hash table 118, LRU frame list 120, control block list 122, and flush frame list 124 can be a data structure responsible for some aspects of the operations, and can benefit from mutex protection. Additional details of hash table 118, LRU frame list 120, control block list 122, and flush frame list 124 will be described below in reference to FIG. 2.

Mutex pool 126 can be a component of buffer manager 102 configured to provide mutex protection for hash table 118, LRU frame list 120, control block list 122, and flush frame list 124 against concurrent access by process 114 and process 116. Buffer manager 102 can be multi-threaded, permitting multiple processes and multiple threads within each process to access data blocks 109, 111, and 113 independently of other processes or threads. Each process or thread can include operations that access some or all of hash table 118, LRU frame list 120, control block list 122, and flush frame list 124.

Buffer manager 102 can provide two types of operations: pin and unpin, to process 114 and process 116. A "pin" operation is a request to buffer manager 102 to fix a specified data block in a memory frame for use by a calling process. If the specified block is not already resident in a memory frame, buffer manager 102 can identify an empty frame in a memory frame pool and read in the data block from data store 104 into the identified empty frame. The "pin" operation can return an address of the memory frame to calling process 114 or 116. Once calling process 114 or 116 finishes using (reading or writing) the data block in the memory frame, calling process 114 or 116 can invoke the "unpin" operation of buffer manager 102 on that data block. The "unpin" operation can include a notification that, at least temporarily, calling process 114 or 116 no longer needs to access that data block. Buffer manager 102 can guarantee that a memory frame hosting a block pinned by one more requesting processes is not evicted until all the calling processes have invoked the unpin operation on the block.

Mutex pool 126 can provide one or more mutex objects for serving the requests. Each mutex object is an object that, once retrieved from mutex pool 126, can protect one or more resources. Each mutex object can be associated with a group of data structures. The group of data structures can include a portion of hash table 118, a portion of LRU frame list 120, a portion of control block list 122, and a portion of flush frame list 124. The group of data structures can be designated as a class based on a common attribute. The requesting process (e.g., process 114) need not use more than one mutex object to protect all data structures. Meanwhile, process 116 can utilize another mutex object directed to another class of data structures. The other class of data structures can include another portion of hash table 118, another portion of LRU frame list 120, another portion of control block list 122, and another portion of flush frame list 124. The first mutex object and the second mutex object operate in parallel, each locking a different part of the data structures. Additional details on how to divide hash table 118, LRU frame list 120, control block list 122, and flush frame list 124 into classes will be described below in reference to FIG. 2.

Figure 2:
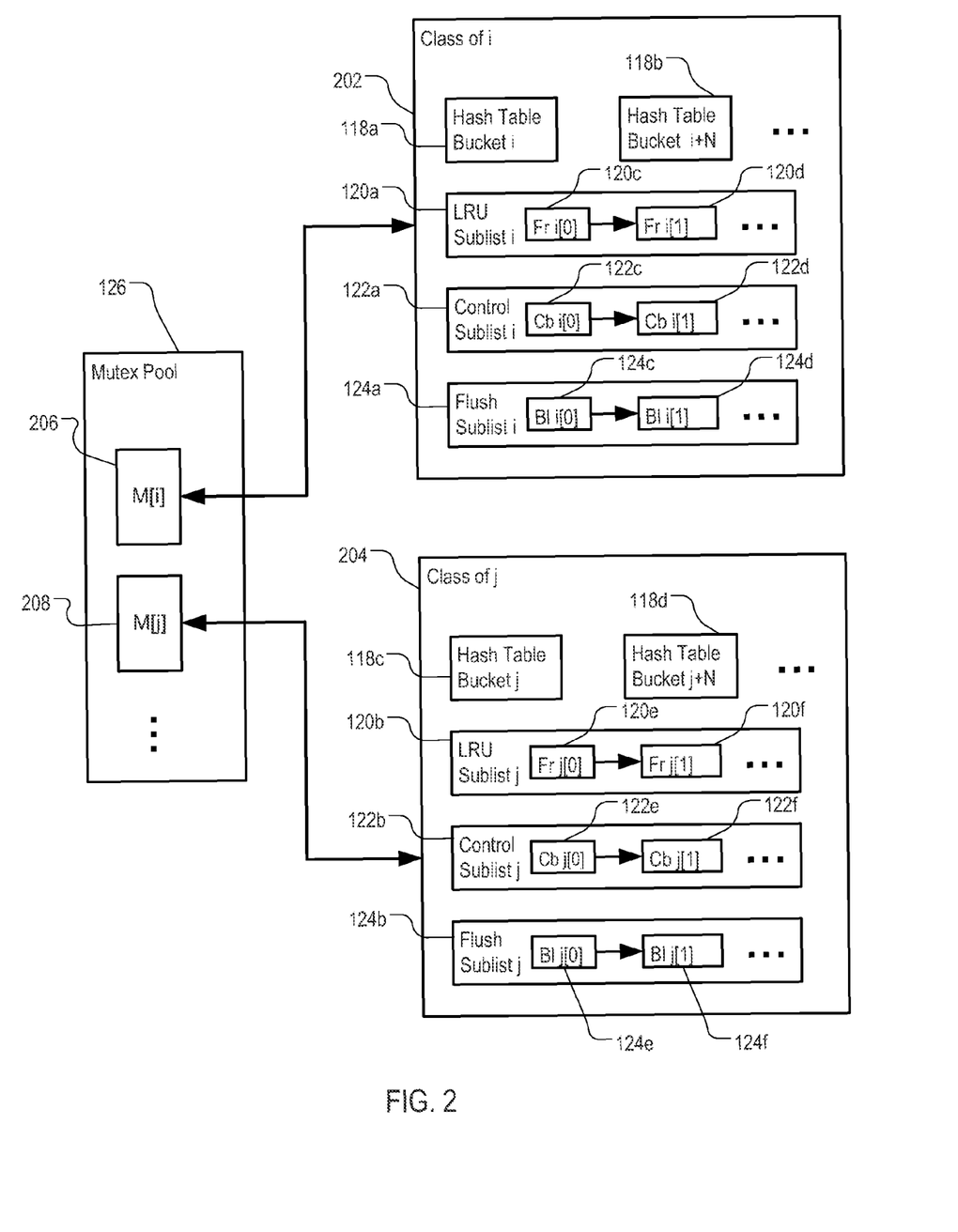
FIG. 2 is a block diagram illustrating mutex objects corresponding to multiple classes of data structures.

FIG. 2 is a block diagram illustrating mutex objects corresponding to multiple classes of data structures. Hash table 118, LRU frame list 120, control block list 122, and flush frame list 124 can be divided into multiple classes, including class 202 and class 204. Each of class 202 and class 204 can be a group of data structures corresponding to a mutex in mutex pool 126. Mutex pool 126 can include a pre-specified number (N) of mutex objects. The mutex objects can be numbered 0 (zero) through N−1. Class 202 can correspond to mutex object 206, which is an i-th mutex object in mutex pool 126. Class 204 can correspond to mutex object 208, which is a j-th mutex object in mutex pool 126, where i and j are integers equal to or greater than zero and less than N.

Class 202 can include portions 118a and 118b of hash table 118. Hash table 118 can be a data structure to facilitate a quick lookup of a data store block in memory 106. Hash table 118 can include a number (B) of buckets. Each bucket can correspond to a linked list of memory frames in memory 106. All memory frames in a same bucket can have a same hash value. Each bucket can correspond to a unique hash value. Hash table 118 can map data identifiers (e.g., a file identifier, a page number within the file, or both) into a bucket. Buffer manager 102 can number the buckets in hash table 118 from 0 (zero) through B−1. A common attribute of data structures designated as class 202, (an i-th class) is that their positions (as specified by a bucket identifier) in their respective tables or lists, when divided by N, result in a same remainder i. To determine which entry of hash table 118 belongs to which class, buffer manager 102 can perform a modulo operation. A hash table bucket having a bucket number b can be assigned to class 202 when (b modulo N) equals i. Accordingly, portion 118a, which includes hash table bucket Bucket[i], and portion 118b, which includes hash table bucket Bucket[i+N], can be assigned to class 202 for mutex object 206 (the i-th mutex object in mutex pool 126). Likewise, a common attribute of data structures designated as class 204, (a j-th class) is that their positions in their respective tables or lists, when divided by N, result in a same remainder j. A hash table bucket having a bucket number b can be assigned to class 204 when (b modulo N) equals j. Accordingly, portion 118c, which includes hash table bucket Bucket[j], and portion 118d, which includes hash table bucket Bucket[j+N], can be assigned to class 204 for mutex object 208, which is the j-th mutex object in mutex pool 126.

Class 202 can include portion 120a of LRU frame list 120. LRU frame list 120 can be a data structure, e.g., a linked list, of memory frames or references to memory frames. A memory frame containing a most recently referenced data block, or a reference to that memory frame, can be located at a head of the data structure. Buffer manager 102 can use LRU frame list 120 to determine a memory frame in which a data block is to be replaced with a new data store data block. The memory frame can be a memory frame located at tail of the data structure. In some implementations, memory 106 can store a relatively small subset of all data blocks in data store 104. Buffer manager 102 can frequently evict data blocks from memory 106 to make space for new data blocks that are requested but are not yet stored in memory 106. Evicting a data block can include replacing the data block stored in a memory frame with a new data block. Buffer manager 102 can identify the data block for replacement from the tail of LRU frame list 120. A position of a memory frame at the tail of LRU frame list 120 can indicate that the data block in that memory frame is least recently referenced, or that the memory frame is free, e.g., does not contain a data block at a given time and is ready for storing a new data block.

LRU frame list 120 can include N number of sublists (e.g., LRU frame sublist 120a of class 202 and LRU frame sublist 120b of class 204) where N is a pre-specified number of mutex objects in mutex pool 126. Each sublist can be a linked list of memory frames. Once calling process 114 or 116 finishes using the pinned block, the process can invoke the unpin operation on that block. The unpin operation can place the frame at the head of the one of the sublists of the LRU frame list 120. To determine which sublist of LRU frame list 120 to place the frame, buffer manager 102 can perform a modulo operation. A memory frame or reference having a bucket number b can be assigned to class 202 (an i-th class) when (b modulo N) equals i. Accordingly, a memory frame having bucket number b such that (b modulo N) equals i (e.g., frame 120c and frame 120d) can be assigned to LRU frame sublist 120a of class 202. Likewise, a memory frame or reference having a bucket number c (e.g., frame 120e and frame 120f) can be assigned to LRU frame sublist 120b of class 204 when (c modulo N) equals j. When a frame in LRU frame sublist 120a or LRU frame sublist 120b becomes free, the free frame can stay in that corresponding sublist. A free frame is a frame that is not currently hosting a data block of any file. Each of LRU frame sublists 120a and 120b can contain a linked list of non-free and free memory frames. Each of the non-free frame can either be pinned or be unpinned.

A temporary control block can be used to ensure that, at any given time, at most one thread or process is reading a data block from data store 104 to a given memory frame in memory 106. A first thread or process that requests a data block that is not already in memory 106 can retrieve a temporary control block from control block list 122, insert the retrieved temporary control block into hash table 118, and proceed to read the data block from data store 104 into a memory frame in memory 106. While the reading operations (e.g., disk I/O) are in process, if another thread or process attempts to request the same data block, the other thread or process can wait for the temporary control block until the first thread or process notifies that the reading operations are complete. A temporary control block can also be used to prevent a data block from being pinned when the data block is chosen for replacement and also being flushed to data store 104 because the data block is dirty. Class 202 and class 204 can each include a portion of control block list 122, e.g., control block sublist 122a and control block sublist 122b, respectively. Control block list 122 can be partitioned into N sublists where N is the number of mutex objects in the mutex pool 126. Each of control block sublist 122a and control block sublist 122b can be a linked list of control blocks or reference to control blocks. For example, control block sublist 122a can include blocks 122c and 122d, whereas control block sublist 122b can include blocks 122e and 122f.

Control block list 122 can include a number (N) of sublists of control blocks or references to control blocks. Process 114 or 116 can attempt to pin a block having bucket number b. If that block is not already in the memory pool, process 114 or 116 can request a control block to put in bucket b of the hash table until the block is read in from data store 104. In response to this request, a control block can be borrowed from a control block sublist from class i where i is (b modulo N).

Class 202 can include sublist 124a of flush frame list 124. Class 204 can include sublist 124b of flush frame list 124. Flush frame list 124 can be a data structure, e.g., a linked list, of memory frames or references to memory frames, that each contains a dirty data block designated to be re-written into data store 104. A memory frame containing an oldest dirty data block can be placed at a head of the data structure.

Flush frame list 124 can include a number (N) of sublists of dirty memory frames or references to dirty memory frames. Process 114 or 116 can pin a data block in a memory frame in the pool. Process 114 or 116 may go on to modify the content of the block in the memory frame. Once the process finishes modifying the block, the process can unpin the frame. When content in the data block is modified, the memory frame can be designated as a dirty frame, which will be flushed to disk eventually. Accordingly, the dirty frame can be placed at the end of one of the sublists of flush frame list 124. To determine which sublist of flush frame list 124, buffer manager 102 can perform a modulo operation. A memory frame or reference having a bucket number b can be assigned to class 202 when (b modulo N) equals i. Accordingly, sublist 124a, which is a sublist of the flush frame list 124 that includes block 124c and block 124d can be assigned to class 202, when block 124c and block 124d each have a bucket number that, when divided by N, has remainder i. Likewise, a memory frame or reference having a bucket number c can be assigned to class 204 when (c modulo N) equals j. Accordingly, sublist 124b, which is a sublist of flush frame list 124 that includes block 124e and block 124f can be assigned to class 204, when block 124e and block 124f each have a bucket number that, when divided by N, has remainder j.

A thread or process may perform operations on the data blocks that access all of hash table 118, LRU frame list 120, control block list 122, and flush frame list 124. Buffer manager 102 can use a single mutex object (e.g., mutex object 206) to protect a class of different data structures. A thread or process accessing a given data block can use a single mutex object on all the data structures related to that data block when the data structures are in a same class. A second thread or process accessing another data block can use another mutex object to access all the data structures related to the other data block. When the protection is spread to N mutex objects in mutex pool 126, no single mutex object can be a bottleneck on all operations. In addition, when all operations of one thread or process on one data block are controlled by one mutex object, a conflict is less likely to develop than when some operations are controlled by a first mutex object and some by a second mutex object.

Exemplary System Components

Figure 3:
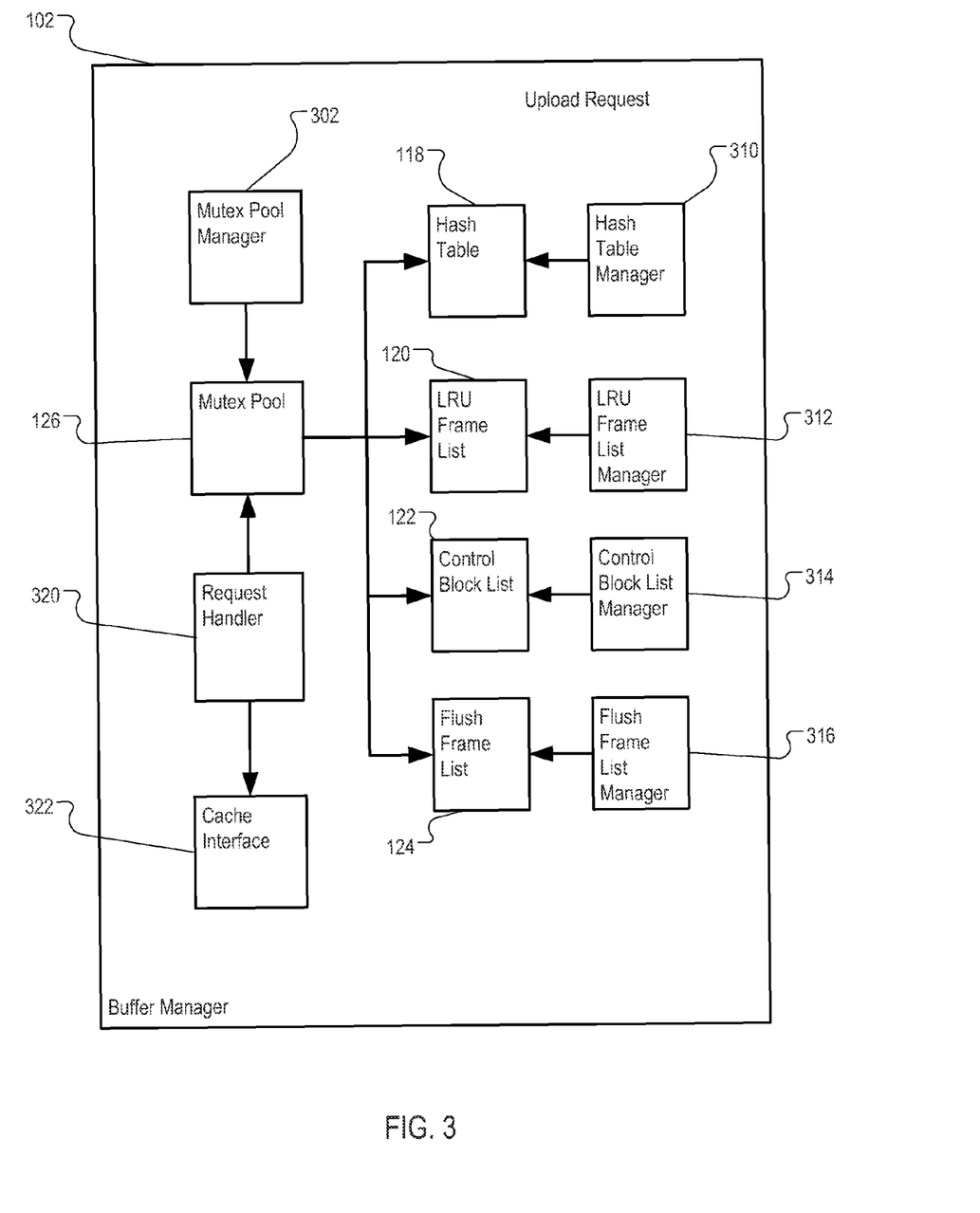
FIG. 3 is a block diagram illustrating components of an exemplary system implementing classes-based mutex techniques.

FIG. 3 is a block diagram illustrating components of an exemplary system of classes-based mutex techniques. The system can include buffer manager 102. Buffer manager 102 can include mutex pool manager 302. Mutex pool manager 302 is a component of buffer manager 102 configured to manage mutex pool 126. Mutex pool manager can determine the number of mutex objects (N) in mutex pool 126. The number N can be a number received from a configuration file, or a number determined based on a size of hash table 118, LRU frame list 120, control block list 122, or flush frame list 124.

Buffer manager 102 can include hash table manager 310. Hash table manager 310 is a component of buffer manager 102 configured to manage hash table 118. Managing hash table 118 can include providing a hash function of allocating a data item to a bucket, modifying the buckets when data blocks are replaced, and allocating hash table 118 to multiple classes based on the number of mutex objects (N) in mutex pool 126.

Buffer manager 102 can include LRU frame list manager 312. LRU frame list manager 312 is a component of buffer manager 102 configured to manage LRU frame list 120. Managing LRU frame list 120 can include managing the N number of sublists each of which is a linked list of frames. Managing LRU frame list 120 can also include adjusting positions of a memory frame or a reference in an LRU frame sublist based on the time a request is received to access a corresponding data block stored in the memory frame.

Buffer manager 102 can include control block list manager 314. Control block list manager 314 is a component of buffer manager 102 configured to manage control block list 122. Managing control block list 122 can include managing the N number of sublists of control blocks. Managing control block list 122 can also include providing a control block to a thread or process when the thread or process requests a data block not already stored in memory 106, creating or retrieving the control block, and unlocking the control block by releasing the control block.

Buffer manager 102 can include flush frame list manager 316. Flush frame list manager 316 is a component of buffer manager 102 configured to manage flush frame list 124. Managing flush frame list 124 can include managing N number of sublists of flush frames. Managing flush frame list 124 can include adding a memory frame to flush frame list 124 when the data block stored in that memory frame is modified, and removed the memory frame from flush frame list 124 when the memory frame is flushed. Flush frame list manager 316 can allocate flush frame list 124 to multiple classes based on the number of mutex objects in mutex pool 126. A dirty frame can be put on a sublist of flush frame list 124, depending on a class of that dirty frame. If the dirty frame has bucket number b, then the dirty frame can be put on a sublist of flush frame list 124, where the sublist has a class i where i is (b modulo N).

Buffer manager 102 can include request handler 320. Request handler 320 is a component of buffer manager 102 configured to receive a request to access a data block, and to determine which of hash table 118, LRU frame list 120, control block list 122, and flush frame list 124 can be used to access the data block. Based on the bucket index of the data block in the request, request handler 320 can determine to which class the respective data structures in hash table 118, LRU frame list 120, control block list 122, and flush frame list 124 belong. Request handler 320 can then identify a corresponding mutex object in mutex pool 126, and use the identified mutex object to protect the data structures.

Buffer manager 102 can include cache interface 322. Cache interface 322 is a component of buffer manager 102 configured to control access of a request data block based on a data structure in hash table 118, LRU frame list 120, control block list 122, and flush frame list 124, and the corresponding mutex object. Cache interface 322 can be configured to retrieve content in a data block as stored in memory 106, or modify content in a data block as stored in memory 106.

Exemplary Procedures

Figure 4:
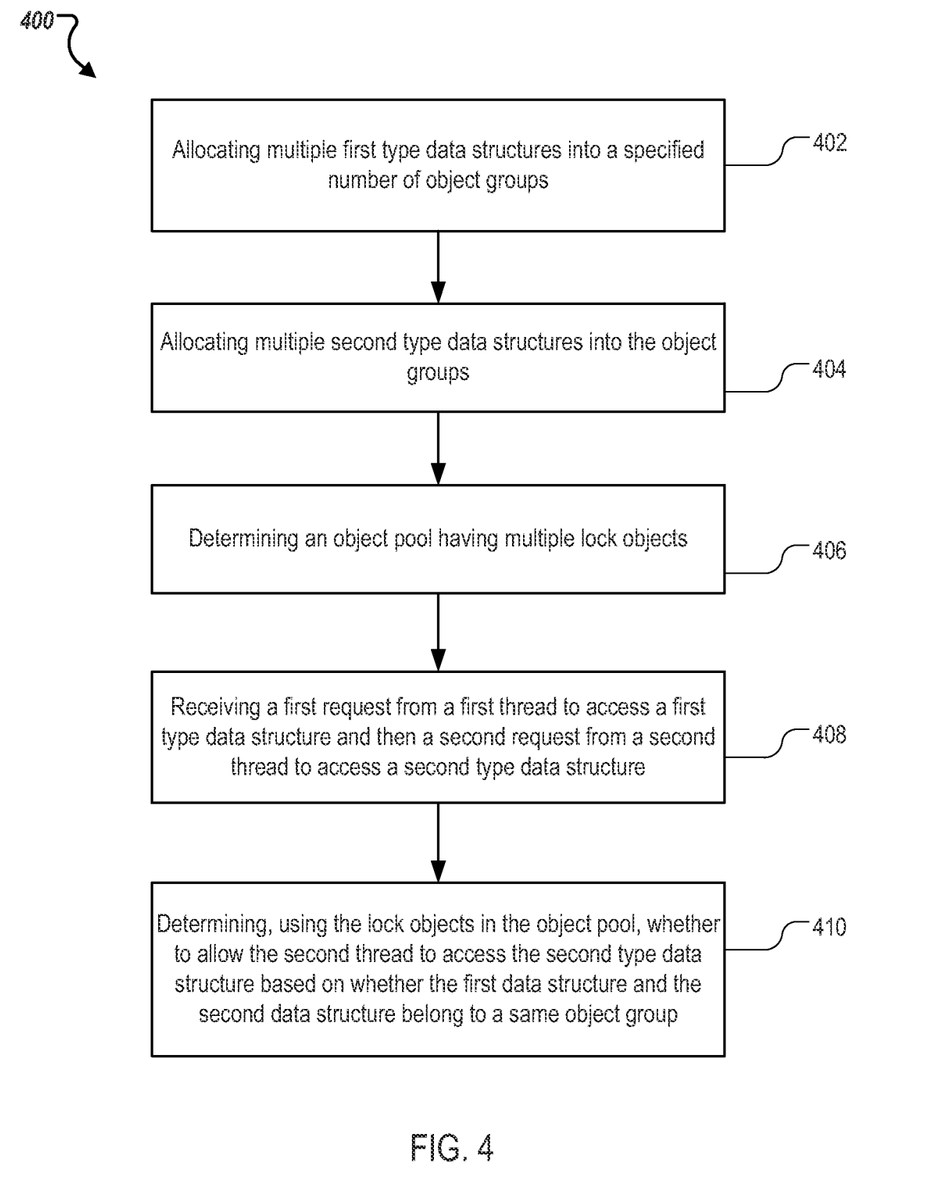
FIG. 4 is a flowchart of an exemplary procedure of using class-based mutex objects to protect multiple types of data structures.

FIG. 4 is a flowchart of exemplary procedure 400 of using class-based mutex objects to protect multiple types of data structures. Procedure 400 can be performed by a system (e.g., buffer manager 102) that includes one or more computer processors.

The system can allocate (402) multiple first type data structures into a specified number (N) of object groups. Each object group can be a class. The class can be identified using an integer greater than or equal to zero and less than N. The system can allocate (404) multiple second type data structures into the object groups. Each of the first type data structure and second type data structure can be an entry (e.g., a bucket in hash table 118) mapping a mass storage device block (e.g., a data item in data store 104) to a memory frame in memory 106. Each of the first type data structure and second type data structure can be a memory frame or a linked list of multiple memory frames in LRU frame list 120. Each of the first type data structure and second type data structure can be a control block or a linked list of multiple control blocks in control block list 122. The control block can be configured to permit at most one thread of an executing application program to read content from a mass storage device block into a corresponding memory frame. Each of the first type data structure and second type data structure can be a memory frame or a linked list of multiple memory frames in flush structure list 124. The memory frame can indicate that a data block in the memory frame has changed since being read from a mass storage device block. The first type data object and second type data object can each have a different type.

The system can determine (406) an object pool containing multiple lock objects. Each lock object can be configured to allow no more than a designated number of instances of executing computer programs to access data structures in a corresponding object group. In some implementations, the object pool can include mutex pool 126. Each lock object can be a mutex object configured to permit at most one instance of an executing computer program to access a given data structure at any given time. In some implementations, each lock object can be an object allowing at most X threads or processes to access a data structure, where X is greater than one.

The first type data structures can be arranged in a first ordered list. For example, hash table entries (buckets) can be arranged in a list of Bucket[0], Bucket[1], . . . Bucket[B−1]. The second type data structures can be arranged in a second ordered list. For example, LRU frame list entries (memory frames) can be arranged in sublists of frames. Each sublist can be a linked list of frames. The lock objects and object groups can be arranged in a third ordered list. For example, mutex objects and their corresponding classes can be arranged in pairs of M[0]-Class[0] . . . M[i]-Class[i] . . . M[N−1]-Class[N−1], where M[i] is a mutex object and Class[i] is an object group corresponding to M[i].

Allocating the first type data structures and the second type data structures to the object groups can be based on modulo operations. When a remainder of a position of a given type data structure in a corresponding ordered list divided by the specified number N is i, the data structure can be allocated to an i-th object group. The number i is an integer greater than or equal to zero and less than the total number of lock objects. The i-th object group can correspond to an i-th lock object in the object pool.

The system can receive (408) a first request from a first instance of an executing computer program to access a first type data structure and then a second request from a second instance of a same or different executing computer program to access a second type data structure. Each of the first instance and second instance can be a thread or a process.

The system can determine (410) whether to allow the second instance of an executing computer program (e.g., a second thread or process) to access the second type data structure based at least in part on whether the first type data structure and the second type data structure belong to a same object group. The system can allow the second instance to access the second type data structure when at least one of the following conditions is satisfied: (a) The first type data structure and the second type data structure are in different object groups; or (b) the first type data structure and the second type data structure are in a same object group, and the lock object corresponding to the object group indicates that, if the second instance is allowed to access the second type data structure, a number of instances of executing computer programs simultaneously accessing data structures in the locked object group does not exceed the designated number. The system can prevent the second instance to access the second type data structure when the following conditions are satisfied: (a) the first type data structure and the second type data structure are in the same object group, which is locked by a lock object corresponding to that object group; and (b) the lock object corresponding to the object group indicates that, if the second instance is allowed to access the second type data structure, a number of instances of executing computer programs simultaneously accessing data structures in the locked object group exceeds the designated number.

Figure 5:
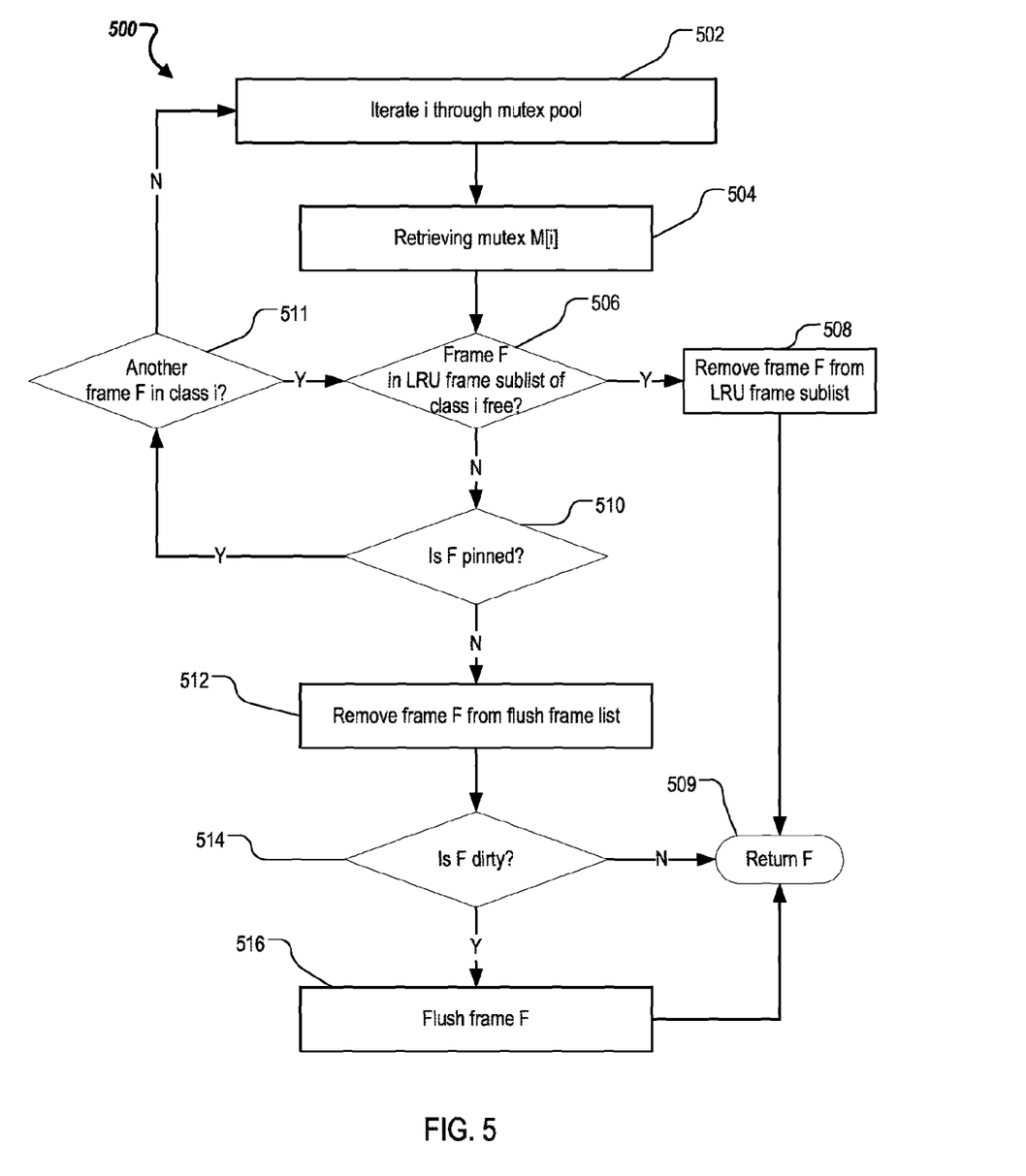
FIG. 5 is a flowchart of an exemplary procedure of using class-based mutex objects to manage memory frames.

FIG. 5 is a flowchart of exemplary procedure 500 of using class-based mutex objects to manage memory frames. A system performing procedure 500 can identify, from LRU frame list 120, a memory frame for storing a new data block read from data store 104. Procedure 500 can return the identified memory frame as a result of the execution. The system can be a system (e.g., buffer manager 102) that includes one or more computer processors.

The system can iterate (502) through each mutex object in mutex pool 126 containing N lock objects (e.g., mutex objects) designated as M[0] . . . M[N−1], respectively. In the i-th iteration, the system can retrieve (504) mutex object M[i] (0<=i<N) from mutex pool 126. The system can use the retrieved mutex object to protect various data structures in class i. Once the system retrieves mutex object M[i] for one thread or process, the system can prevent another thread or process from retrieving mutex object M[i].

The system can then iterate through data structures in class i LRU frame sublist. In each iteration, the system can determine (506) if any memory frame referenced in the class i LRU frame sublist is free. The system can determine that a memory frame is free when the memory frame does not currently contain a data block.

If, in the i-th iteration through the data structures, the system determines that a memory frame ("F" in an LRU frame sublist of class i) is free, the system can remove (508) the memory frame F from the class i LRU frame sublist, release mutex object M[i], and return (509) the free memory frame F for storing the new data block.

In each iteration, if the system determines that a memory frame F in a sub list of class i is not free, the system can determine (510) whether that memory frame F is pinned. The system can determine that a memory frame is pinned when the memory frame currently contains a data block that is being used by one or more threads or processes. If the memory frame F is pinned, the system can determine (511) if there is at least one more memory frame in class i that have not been examined. Upon determining that there is at least one more unexamined memory frame, the system can move to a next unexamined memory frame in LRU frame sublist of class i and determine (506) if that memory frame is free. If all memory frames in class i are examined, the system can make the (i+1)th iteration by moving to a next class (class i+1).

When the system determines that the memory frame F in a sublist in class i is not pinned, the system can determine whether the memory frame F is dirty. If memory frame F is dirty, the system can remove memory frame F from flush frame list 124. The system can store a status of whether memory frame F is dirty in a local variable.

The system can then remove (512) memory frame F from LRU frame sublist of class i. The system can determine (514), based on the previously stored local variable, if memory frame F is dirty. If memory frame F is not dirty, the system can release mutex object M[i] and return (509) memory frame F. If memory frame F is dirty, the system can flush (516) memory frame F to data store 104. The operations of flushing memory frame F will be described in addition details below in reference to FIG. 6. The system can then release mutex object M[i] and return (509) memory frame F.

Figure 6:
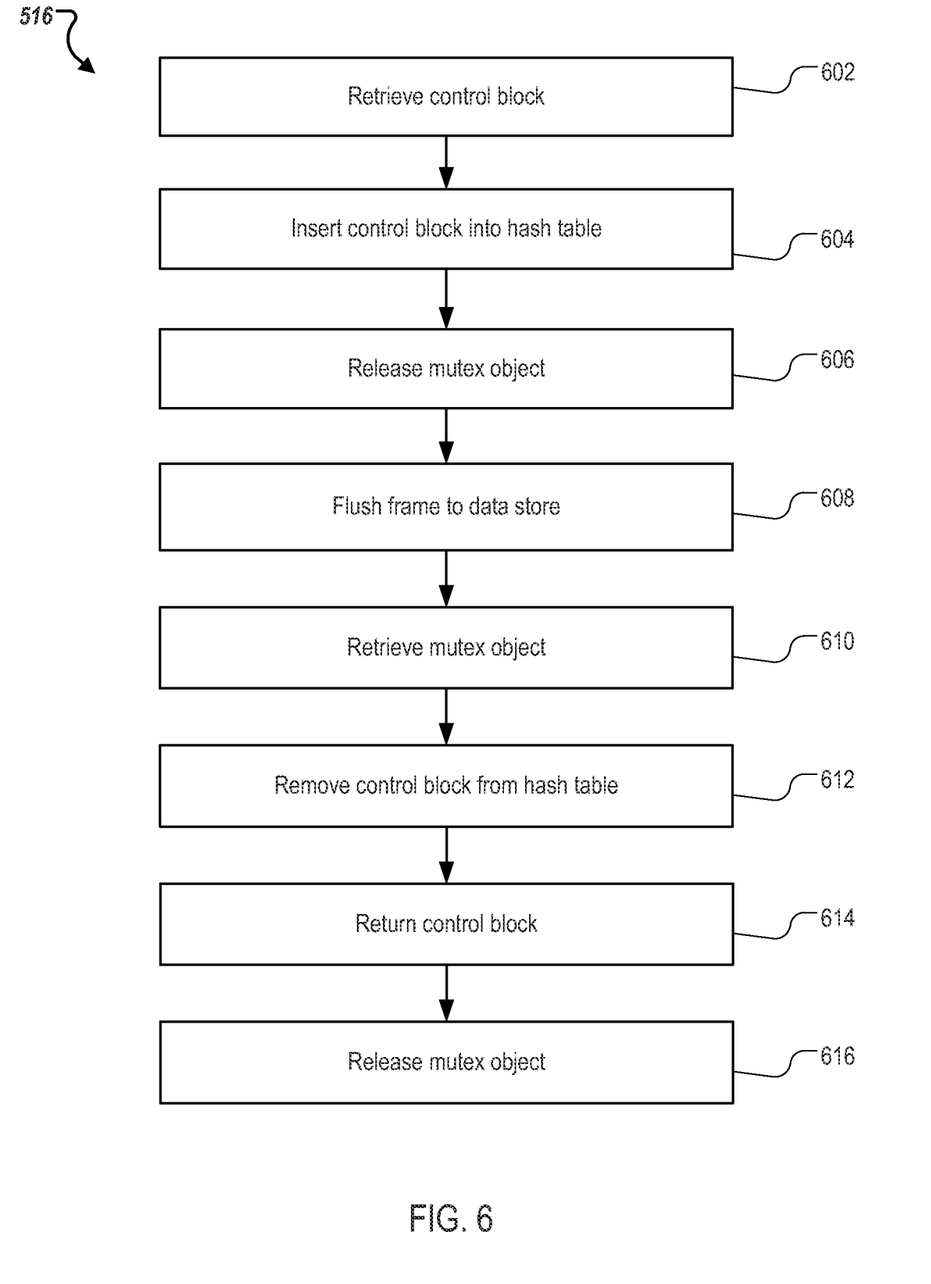
FIG. 6 is a flowchart of an exemplary procedure of flushing a dirty memory frame protected by a class-based mutex object.

FIG. 6 is a flowchart of exemplary procedure 516 of flushing a dirty memory frame protected by a class-based mutex object. For convenience, procedure 516 will be described in reference to an i-th iteration through mutex objects in mutex pool 126 through class i data structures in procedure 500 executed on a system. Before performing procedure 516, the system has already identified a dirty memory frame F for flushing.

The system can retrieve (602), from control block list 122, a control block corresponding to memory frame F. The control block can be obtained from the i-th sublist of control block list 122 where i is (b mod N), and where b is bucket index of the frame being flushed. The system can then insert (604) the retrieved control block into hash table 118. The system can then release (606) mutex object M[i]. The system can flush content in memory frame F to data store 104 (608). After the writing operations, the system can retrieve (610) mutex object M[i]. The system can then remove (612) the retrieved control block from hash table 118. The system can return (614) the control block to control sublist of class i. The system can then release (616) mutex object M[i].

After the system retrieves mutex object M[i] for a particular process or thread and before the system releases mutex object M[i], other process or threads that attempts to retrieve mutex object M[i] can wait until mutex object M[i] is released. Pseudo code for performing the operations described in reference to FIGS. 5 and 6 are provided below in Listing 1.

---
Listing 1: Identifying a frame for replacement
---
Iterate i through 1...N where N is the total number of mutex objects in a pool
   Retrieve mutex object M[i]
   Iterate through each frame in LRU frame sublist in class i
     If memory frame F is free Then
       Remove F from LRU frame sublist of class i
       Release mutex object M[i]
       Return F
     End If
     If F is not pinned Then
       If F is dirty Then
         Remove F from flush frame sublist of class i
       End If
       Remove F from LRU frame sublist of class i
       If F is dirty Then
         Retrieve a temporary control block
         Insert the temporary control block into hash table
         Release mutex object M[i]
         Flush F to disk
         Retrieve mutex object M[i]
         Remove the temporary control block from hash table
         Return the temporary control block to the control block sublist
         Release mutex object M[i]
         Return F
       Else //when frame is clean
         Release mutex object M[i]
         Return F
       End If // frame is dirty
     End If //Frame is not pinned)
   End Iteration // through frames in LRU frame sublist of class i
End Iteration // i though 1...N

---

Exemplary System Architecture

Figure 7:
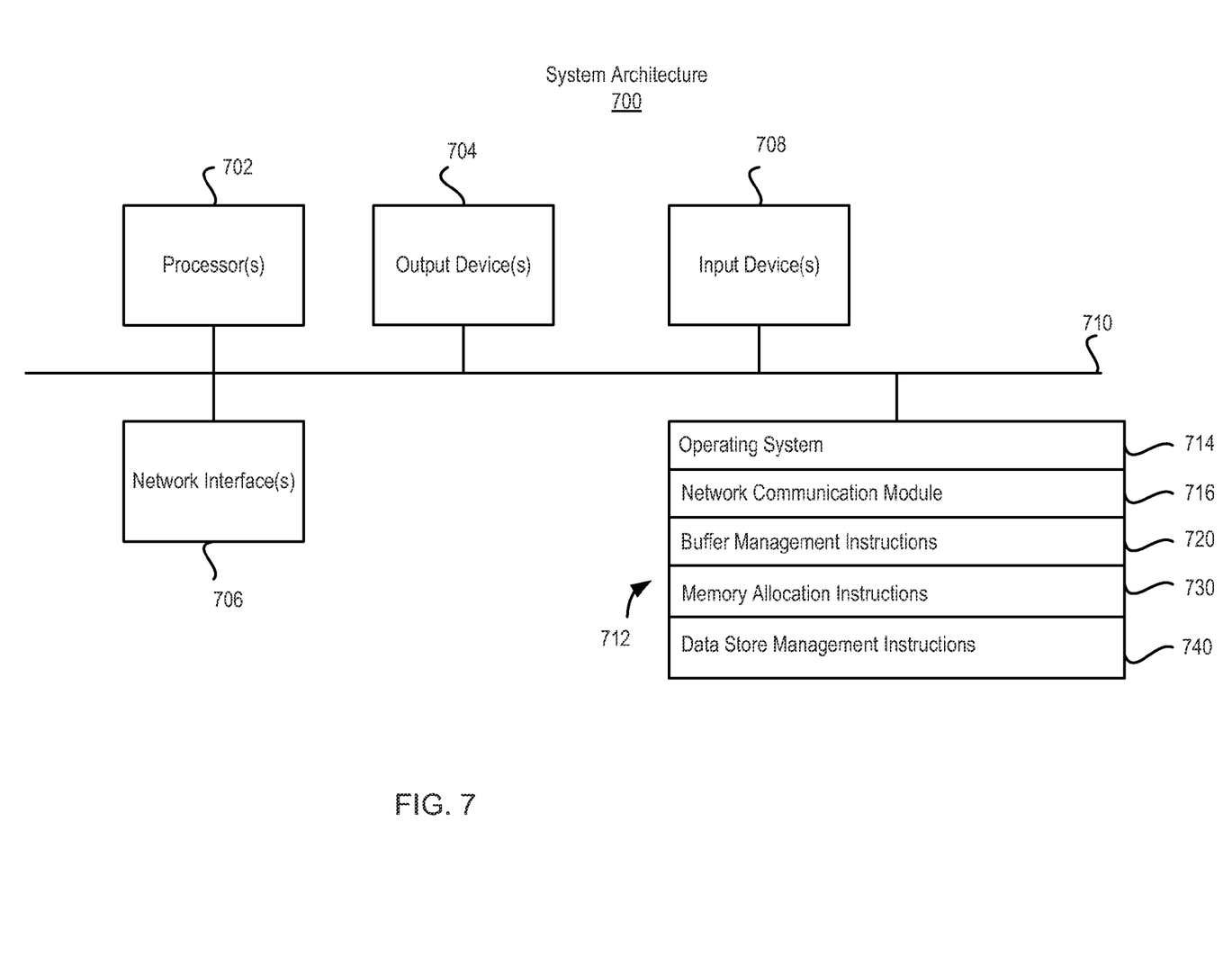
FIG. 7 is a block diagram of an exemplary system architecture for implementing the features and operations of FIGS. 1-6.

FIG. 7 is a block diagram of exemplary system architecture 700 for implementing the features and operations of FIG. 1-6. Other architectures are possible, including architectures with more or fewer components. In some implementations, architecture 700 includes one or more processors 702 (e.g., dual-core Intel® Xeon® Processors), one or more output devices 704 (e.g., LCD), one or more network interfaces 706, one or more input devices 708 (e.g., mouse, keyboard, touch-sensitive display) and one or more computer-readable mediums 712 (e.g., RAM, ROM, SDRAM, hard disk, optical disk, flash memory, etc.). These components can exchange communications and data over one or more communication channels 710 (e.g., buses), which can utilize various hardware and software for facilitating the transfer of data and control signals between components.

The term "computer-readable medium" refers to any medium that participates in providing instructions to processor 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 712 can further include operating system 714 (e.g., Mac OS® server, Windows Server®, or iOS®), network communication module 716, buffer management instructions 720, memory allocation instructions 730, and data store management instructions 740. Operating system 714 can be multi-user, multiprocessing, multitasking, multithreading, real time, etc. Operating system 714 performs basic tasks, including but not limited to: recognizing input from and providing output to devices 706, 708; keeping track and managing files and directories on computer-readable mediums 712 (e.g., memory or a storage device); controlling peripheral devices; and managing traffic on the one or more communication channels 710. Network communications module 716 includes various components for establishing and maintaining network connections (e.g., software for implementing communication protocols, such as TCP/IP, HTTP, etc.). Buffer management instructions 720 can include computer instructions that, when executed, cause processor 702 to perform operations of buffer manager 102. Memory allocation instructions 730 can include computer instructions that, when executed, cause processor 702 to designate a portion of computer memory for storing data blocks of data store 104, and to divide the portion of computer memory into frames for storing data blocks. Data store manage instructions 740 can include computer instructions that, when executed, cause processor 702 to read or write into a data store, and to manage access to the data store.

Architecture 700 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention.

What is claimed is:

1. A method comprising:
allocating, by one or more computers, a plurality of first type data structures into a specified number of object groups;
allocating, by the one or more computers, a plurality of second type data structures into the object groups;
determining, by the one or more computers, an object pool containing a plurality of lock objects, each lock object being configured to allow no more than a designated number of instances of executing computer programs to access data structures in a corresponding object group;
receiving, by the one or more computers, a first request from a first instance of an executing computer program to access a first type data structure and then a second request from a second instance of a same or different executing computer program to access a second type data structure;
determining, by the one or more computers, whether to allow the second instance to access the second type data structure based at least in part on whether the first type data structure and the second type data structure belong to a same object group, wherein: the one or more computers prevent the second instance to access the second type data structure upon determining that:
the first type data structure and the second type data structure are in the same object group, which is locked by a lock object corresponding to that object group; and
the lock object corresponding to the object group indicates that, if the second instance is allowed to access the second type data structure, a number of instances of executing computer programs simultaneously accessing data structures in the locked object group exceeds the designated number.

2. The method of claim 1, wherein each of the first type data structures and the second type data structures is one of:
a hash table entry mapping a mass storage device block to a memory frame, the memory frame being a unit of memory for storing a data block corresponding to the mass storage device block;
a frame in a least-recent used (LRU) frame list;
a control block in a control block list, the control block configured to permit at most one thread of an executing application program to read content from a mass storage device block into a corresponding memory frame; or a flush frame in a flush frame list, the flush frame corresponding to a memory frame and indicating that a data block in the memory frame has changed since being read from a mass storage device block.

3. The method of claim 1, wherein each lock object is a mutual exclusion (mutex) object configured to permit at most one instance of an executing computer program to access a given data structure at any given time.

4. The method of claim 1, wherein the first type data structures are arranged in a first ordered list, the second type data structures are arranged in a second ordered list, and the lock objects and object groups are arranged in a third ordered list.

5. The method of claim 4, wherein allocating the first type data structures and the second type data structures to the object groups are based on modulo operations, wherein, when a remainder of a position of a given type data structure in a corresponding ordered list divided by the specified number is i, the data structure is allocated to an i-th object group, wherein i is an integer less than the number of lock objects.

6. The method of claim 5, wherein the i-th object group corresponds to an i-th lock object in the object pool.

7. The method of claim 1, wherein the specified number is smaller than at least one of a total number of the first type data structures or a total number of the second type data structures.

8. The method of claim 1, wherein the one or more computers allow the second instance to access the second type data structure upon determining that:

the first type data structure and the second type data structure are in different object groups; or the first type data structure and the second type data structure are in a same object group, and the lock object corresponding to the object group indicates that, if the second instance is allowed to access the second type data structure, a number of instances of executing computer programs simultaneously accessing data structures in the locked object group does not exceed the designated number.

9. A system comprising:
one or more processors; and
a non-transitory storage medium coupled to the one or more processors and storing computer instructions operable to cause the one or more processors to perform operations comprising:
allocating a plurality of first type data structures into a specified number of object groups;
allocating a plurality of second type data structures into the object groups;
determining an object pool containing a plurality of lock objects, each lock object being configured to allow no more than a designated number of instances of executing computer programs to access data structures in a corresponding object group;
receiving a first request from a first instance of an executing computer program to access a first type data structure and then a second request from a second instance of a same or different executing computer program to access a second type data structure;
determining whether to allow the second instance to access the second type data structure based at least in part on whether the first type data structure and the second type data structure belong to a same object group, wherein: the one or more computers prevent the second instance to access the second type data structure upon determining that:

the first type data structure and the second type data structure are in the same object group, which is locked by a lock object corresponding to that object group; and the lock object corresponding to the object group indicates that, if the second instance is allowed to access the second type data structure, a number of instances of executing computer programs simultaneously accessing data structures in the locked object group exceeds the designated number.

10. The system of claim 9, wherein each of the first type data structures and the second type data structures is one of:

a hash table entry mapping a mass storage device block to a memory frame, the memory frame being a unit of memory for storing a data block corresponding to the mass storage device block;

a frame in a least-recent used (LRU) frame list;

a control block in a control block list, the control block configured to permit at most one thread of an executing application program to read content from a mass storage device block into a corresponding memory frame; or a flush frame in a flush frame list, the flush frame corresponding to a memory frame and indicating that a data block in the memory frame has changed since being read from a mass storage device block.

11. The system of claim 9, wherein each lock object is a mutual exclusion (mutex) object configured to permit at most one instance of an executing computer program to access a given data structure at any given time.

12. The system of claim 9, wherein the first type data structures are arranged in a first ordered list, the second type data structures are arranged in a second ordered list, and the lock objects and object groups are arranged in a third ordered list.

13. The system of claim 12, wherein allocating the first type data structures and the second type data structures to the object groups are based on modulo operations, wherein, when a remainder of a position of a given type data structure in a corresponding ordered list divided by the specified number is i, the data structure is allocated to an i-th object group, wherein i is an integer less than the number of lock objects.

14. The system of claim 13, wherein the i-th object group corresponds to an i-th lock object in the object pool.

15. The system of claim 9, wherein the specified number is smaller than at least one of a total number of the first type data structures or a total number of the second type data structures.

16. The system of claim 9, wherein the one or more processors allow the second instance to access the second type data structure upon determining that:

the first type data structure and the second type data structure are in different object groups; or the first type data structure and the second type data structure are in a same object group, and the lock object corresponding to the object group indicates that, if the second instance is allowed to access the second type data structure, a number of instances of executing computer programs simultaneously accessing data structures in the locked object group does not exceed the designated number.

17. A non-transitory storage medium coupled to one or more processors and storing computer instructions operable to cause the one or more processors to perform operations comprising:

allocating a plurality of first type data structures into a specified number of object groups;

allocating a plurality of second type data structures into the object groups;

determining an object pool containing a plurality of lock objects, each lock object being configured to allow no more than a designated number of instances of executing computer programs to access data structures in a corresponding object group;

receiving a first request from a first instance of an executing computer program to access a first type data structure and then a second request from a second instance of a same or different executing computer program to access a second type data structure;

determining whether to allow the second instance to access the second type data structure based at least in part on whether the first type data structure and the second type data structure belong to a same object group, wherein: the one or more computers prevent the second instance to access the second type data structure upon determining that:

the first type data structure and the second type data structure are in the same object group, which is locked by a lock object corresponding to that object group; and the lock object corresponding to the object group indicates that, if the second instance is allowed to access the second type data structure, a number of instances of executing computer programs simultaneously accessing data structures in the locked object group exceeds the designated number.

18. The non-transitory storage medium of claim 17, wherein each of the first type data structures and the second type data structures is one of:

a hash table entry mapping a mass storage device block to a memory frame, the memory frame being a unit of memory for storing a data block corresponding to the mass storage device block;

a frame in a least-recent used (LRU) frame list;

a control block in a control block list, the control block configured to permit at most one thread of an executing application program to read content from a mass storage device block into a corresponding memory frame; or a flush frame in a flush frame list, the flush frame corresponding to a memory frame and indicating that a data block in the memory frame has changed since being read from a mass storage device block.

19. The non-transitory storage medium of claim 17, wherein each lock object is a mutual exclusion (mutex) object configured to permit at most one instance of an executing computer program to access a given data structure at any given time.

20. The non-transitory storage medium of claim 17, wherein the first type data structures are arranged in a first ordered list, the second type data structures are arranged in a second ordered list, and the lock objects and object groups are arranged in a third ordered list.

21. The non-transitory storage medium of claim 20, wherein allocating the first type data structures and the second type data structures to the object groups are based on modulo operations, wherein, when a remainder of a position of a given type data structure in a corresponding ordered list divided by the specified number is i, the data structure is allocated to an i-th object group, wherein i is an integer less than the number of lock objects.

22. The non-transitory storage medium of claim 21, wherein the i-th object group corresponds to an i-th lock object in the object pool.

23. The non-transitory storage medium of claim 17, wherein the specified number is smaller than at least one of a total number of the first type data structures or a total number of the second type data structures.

24. The non-transitory storage medium of claim 17, wherein the one or more processor allow the second instance to access the second type data structure upon determining that:

the first type data structure and the second type data structure are in different object groups; or the first type data structure and the second type data structure are in a same object group, and the lock object corresponding to the object group indicates that, if the second instance is allowed to access the second type data structure, a number of instances of executing computer programs simultaneously accessing data structures in the locked object group does not exceed the designated number.

* * * * *